United States Patent [19]

Vignotto

[11] Patent Number: 5,132,616
[45] Date of Patent: Jul. 21, 1992

[54] POLARIZED MAGNETIC RING FOR SPEED SENSING BEARING ASSEMBLY

[75] Inventor: Angelo Vignotto, Turin, Italy

[73] Assignee: RIV-SKF Officine di Villar Persosa S.p.A., Turin, Italy

[21] Appl. No.: 588,154

[22] Filed: Sep. 26, 1990

[51] Int. Cl.⁵ .............................................. G01P 3/488
[52] U.S. Cl. ................................................... 324/174
[58] Field of Search ................... 73/518–520; 324/173, 174, 178, 179, 166, 164; 384/448; 310/168

[56] References Cited

U.S. PATENT DOCUMENTS

| | | | |
|---|---|---|---|
| 3,465,327 | 9/1969 | Schroter et al. | 324/174 |
| 3,772,549 | 11/1973 | Cumming | 310/168 |
| 4,667,156 | 5/1987 | Machino et al. | 324/173 |
| 4,904,936 | 2/1990 | Richmond | 324/174 |
| 4,969,753 | 11/1990 | Kato et al. | 384/448 |

FOREIGN PATENT DOCUMENTS 0142266  7/1985  Japan ................................. 324/166

Primary Examiner—Robert Raevis
Attorney, Agent, or Firm—Eugene E. Renz, Jr.

[57] ABSTRACT

Polarized magnetic ring for determining the speed of a rotating element of the type placed on the periphery of the outer rotating ring of the wheel hub bearing and which has the polarized surface facing a sensor for detecting the speed of rotation of the wheel hub, characterized in that a metal sleeve that holds it tightly on the bearing ring is slipped over the magnetic ring.

4 Claims, 1 Drawing Sheet

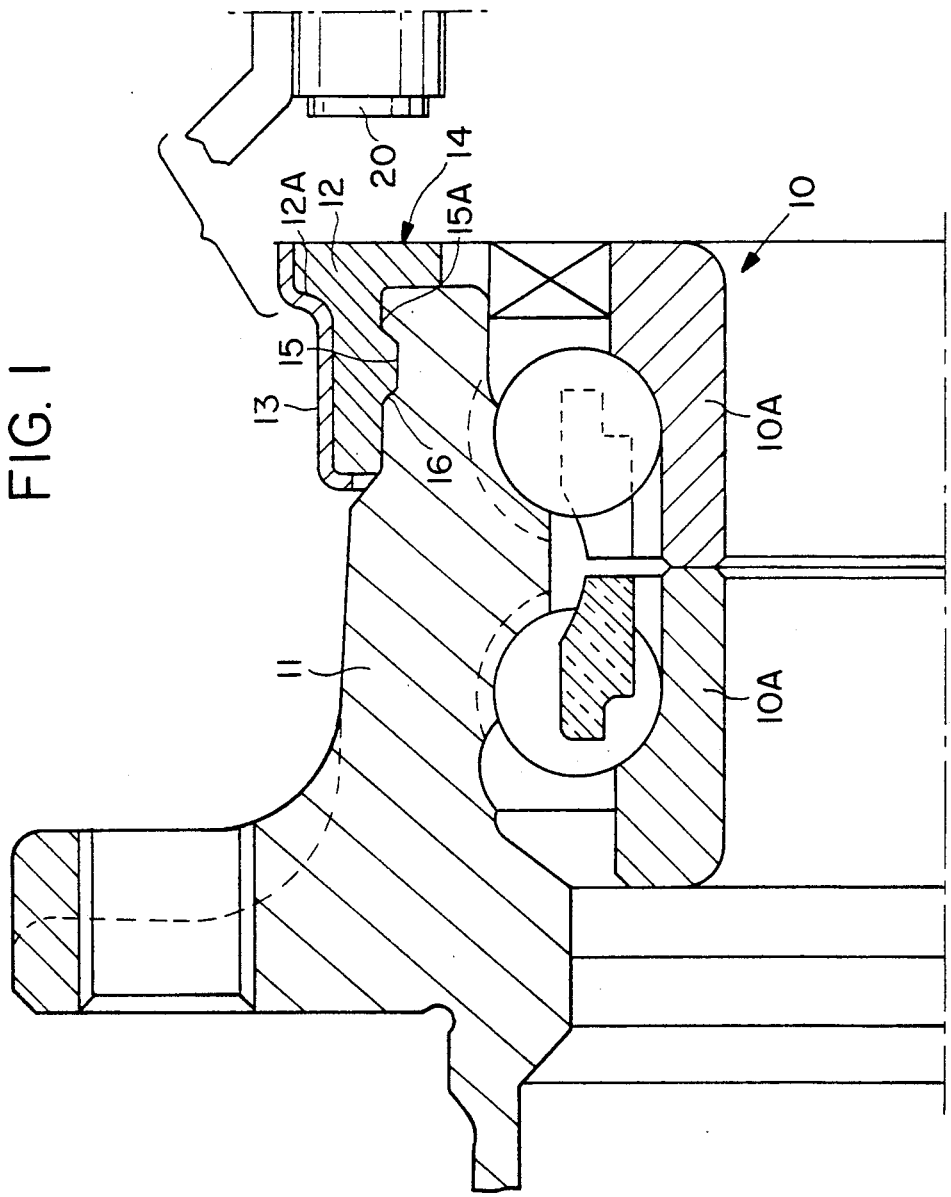

POLARIZED MAGNETIC RING FOR SPEED SENSING BEARING ASSEMBLY

FIELD OF THE INVENTION

The present invention relates to improvements in bearings for determining speed of a rotating element. More specifically the invention relates to a polarized magnetic ring equipped with a protective sleeve.

BACKGROUND OF THE INVENTION

Polarized magnetic rings are commonly used in applications for determining the speed of rotating elements such as in the wheel bearings of motor vehicles. In these installations, the polarized magnetic ring is anchored on the rotating ring of the wheel hub bearing and a suitable sensor is located axially or radially opposite the magnetic ring to determine to rotational speed of the wheel and to transmit this information to appropriate processing systems that have various functions such as in AB SKF braking systems.

It has been found that in these installations there are certain disadvantages and drawbacks. For example, the polarized magnetic rings tend to attract metal particles normally present in the environment and this can cause problems with the detection of the signals and the proper functioning of the device in general. Furthermore, presently, the magnetic rings are usually mounted without additional constraints on the outer ring of the bearing. In these installations it has been found that vibrations, jolts and other sudden movements to which the bearing itself is subjected causes axial movement of the magnetic ring. This movement is undesirable since it adversely affects the accuracy of the sensing system.

SUMMARY OF THE INVENTION

With the foregoing in mind, it is an object of the present invention to provide a polarized magnetic ring having a protective sleeve which protects and isolates the ring from metal particles in the surrounding environment and also serves to provide a better anchor of the ring on the rotating ring of the bearing. The metal sleeve is also characterized by novel features according to the invention which improves the orientation of the magnetic flux in the desired direction, i.e., the direction in which the sensor associated with the polarized magnetic ring itself is located.

To this end and in accordance with the present invention, the polarized magnetic ring for determining the speed of a rotating element is placed on the periphery of the outer ring of the wheel hub bearing so that its polarized surface faces a sensor for detecting the speed of rotation of the wheel hub. A metal protective sleeve engages over the magnetic ring to hold it in place on the bearing ring.

BRIEF DESCRIPTION OF THE DRAWINGS

These and other objects of the present invention and the various features and details of the operation and construction thereof are hereinafter more fully set forth with reference to the accompanying drawings, where:

FIG. 1 shows a transverse sectional view of a wheel hub bearing incorporating a polarized magnetic ring mounted and constructed in accordance with the present invention.

DETAILED DESCRIPTION OF THE PREFERRED EMBODIMENT

Referring now to the drawing, there is illustrated a wheel hub bearing generally designated by the numeral 10 comprising a double row ball bearing having separate inner rings 10A with raceways and a common outer ring 11 with a pair of axially spaced outer raceways. The outer ring 11 has bolt holes to secure it to the wheel and is thus the rotating ring of the bearing assembly. A polarized magnetic ring 12 is fixed on the outer ring 11 in the manner shown and is held in place by a metal sleeve 13 which completely circumscribes the entire circumferential lateral outer surface 12A of the magnetic ring 12. In this manner, the only exposed part of the polarized magnetic ring 12 is its axial end surface 14 which faces a sensor 20 for determining the speed of rotation of the outer ring 11 and thus the speed of the wheel of the vehicle.

The metal ring 13 circumscribing the outer peripheral surface of the magnetic ring 12 thereby protects the magnetic ring 12 from metal particles in the environment that would tend to attract radially on its lateral surface 12A. Furthermore, the metal sleeve 13 presses the magnetic ring 12 on the outer ring 11 of the bearing to hold it securely in place. The particular configuration of the sleeve 13 also directs the magnetic flux of the polarized ring 12 to be oriented axially, i.e., in the direction of the sensor 20 which faces the polarized ring 12 to produce more accurate transmission of signals.

The configuration of the polarized magnetic ring 12 is important in securing it firmly in place and having a large axial end surface area for better transmission of the sensing signals. To this end the magnetic ring 12 as best illustrated in the drawing is of a T-shaped cross section to provide a large surface area for the axial end face 14 and yet take up only a small amount of space in a radial direction so that the bearing is relatively compact. The magnetic ring 12 is also held securely on the rotating ring 11 of the bearing against any axial displacements due to vibration or accidental jolts which could adversely affect the operation of the sensing system. To this end, the leg of the T-shaped magnetic ring 12 has a radially inwardly directed rib 15 which engages in a circumferentially extending groove 16 in the seat 15A adjacent the free outer axial end of the outer ring 11. The engagement of the projection 15 of the ring in the groove 16 eliminates completely any risks of axial displacement of the magnetic ring during operation.

There are several possibilities for assembly of the sleeve 13 and polarized ring 12 to the inner ring 11. For example, the sleeve 13 may be mounted on the ring 12 conforming to the shape of the outer periphery 12A of the ring 12 and then simply pressed on to the runner ring 11 from an axial direction so that the parts are assembled by pressure alone. Alternatively, the polarized ring 12 may be assembled with a slight interference and the sleeve 13 deformed after positioning the sleeve 13 and ring 12 in place on the inner ring 11. A caulking may be interposed between the sleeve 13 and polarized ring 12.

Even though a particular embodiment of the present invention has been illustrated and described herein, it is not intended to limit the invention and changes and modifications may be made therein within the scope of the following claims.

What is claimed is:

1. Polarized magnetic ring for determining the speed of a rotating element placed on the periphery of the outer rotating bearing ring of a wheel hub bearing and which has the polarized surface facing a sensor for detecting the speed of rotation of the wheel hub, characterized in that a metal sleeve that holds the polarized magnetic ring tightly on the bearing ring is slipped over the magnetic ring whereby the metal sleeve directs the magnetic flux toward the sensor.

2. Polarized magnetic ring according to claim 1, characterized in that the polarized magnetic ring includes a central tongue and has an essentially T-shaped cross section or profile with the central tongue held tightly on the rotating element by the metal sleeve.

3. Polarized magnetic ring according to claim 1 characterized in that the metal sleeve completely covers the surface of the polarized magnetic ring not facing the sensor.

4. Polarized magnetic ring according to claim 1, characterized in that the polarizing magnetic ring includes an annular projection which engages in a corresponding groove in the bearing ring in which the polarizing magnetic ring is lodged.

* * * * *